United States Patent [19]
Chen et al.

[11] Patent Number: 5,727,199
[45] Date of Patent: Mar. 10, 1998

[54] DATABASE MINING USING MULTI-PREDICATE CLASSIFIERS

[75] Inventors: Ming-Syan Chen, Yorktown Heights; Philip Shi-Ling Yu, Chappaqua, both of N.Y.

[73] Assignee: International Business Machines Corporation, Armonk, N.Y.

[21] Appl. No.: 558,066

[22] Filed: Nov. 13, 1995

[51] Int. Cl.$^6$ .................................................. G06F 17/30
[52] U.S. Cl. ............................................ 395/606; 395/605
[58] Field of Search ..................................... 395/606, 605

[56] References Cited

U.S. PATENT DOCUMENTS

| 5,442,781 | 8/1995 | Yamagata | 395/603 |
| 5,544,352 | 8/1996 | Egger | 395/605 |
| 5,546,578 | 8/1996 | Takada | 395/605 |
| 5,598,557 | 1/1997 | Doner et al. | 395/605 |
| 5,615,341 | 3/1997 | Agrawal et al. | 395/210 |

OTHER PUBLICATIONS

Mannila et al, "Improved Methods for Finding Rules", Pub. No. C–1993–65, 20 pages, University of Helsinki, Dec. 31, 1993.

Agrawal et al, "Mining Association Rules betweem Sets of Items in Large Databases",PROC of the ACM SIGMOD Conference on Management of Data, May 31, 1993, pp. 207–216.

Agrawal et al, "Fast Algorithms for Mining Association Rules", Proc. of the 20th VLDB Conference, Santiago, Chile, Dec. 31, 1994.

R. Agrawal et al., "An Interval Classifier for Datatbase Mining Applications", Proceedings of the 18th International Conference on Very Large Data Bases, p. 560–573, Aug.1992.

J.R. Quinlan, "Induction of Decision Trees", Machine Learning, vol. 1, p. 81–106, 1986.

Primary Examiner—Wayne Amsbury
Attorney, Agent, or Firm—Kevin M. Jordan

[57] ABSTRACT

A computer implemented system, two-step method and computer program product which improves the operations of multi-feature extraction and which efficiently develops classification rules from a large training database. Specifically, given a large training set of data tuples, the first phase, called the feature identification phase, identifies features, which have good power in separating data tuples, based on a subset of the training set. A feature that has a good power in correlating data tuples into groups is said to have a good discriminating power. Since the feature identification phase is performed on a subset of the training set, processing costs are minimized. Limiting this phase to the identification of features having good discriminating power ensures that the use of a subset of the training set does not adversely affect the validity of the conclusions drawn therefrom. In the second phase, called the feature combination phase, the identified features are evaluated in combination against the entire training set to determine the final classification rules. The prior identification of features having good discriminating power advantageously minimizes processing costs during this phase (which is run against the entire training set). The use of multiple features advantageously increases the discrimination power beyond that of the individual features.

15 Claims, 4 Drawing Sheets

DATABASE MINING USING MULTI-PREDICATE CLASSIFIERS

BACKGROUND OF THE INVENTION

1. Field of the Invention

The present invention relates to a computer implemented system, method and computer program product for mining classification rules from a computer database.

2. Related Art

Due to the increasing use of computing for various applications, the importance of database mining is growing rapidly. For example, progress in bar-code technology has enabled retail organizations to collect and store massive amounts of sales data. Catalog companies can also collect sales data on the orders they receive. Analysis or mining of past transaction data can provide very valuable information on customer buying behavior, and thus improve the quality of business decisions such as: what to put on sale; which merchandise should be placed on shelves together; and how to customize marketing programs, to name a few. It is essential however, to collect a sufficient amount of sales data before any meaningful conclusions can be drawn therefrom. It is hence important to devise efficient methods to conduct mining on these large databases.

Various data mining capabilities have been explored in the literature. Data mining is a broad field with many application-dependent problems requiring different mining techniques to solve. One application is 'mining association rules' from a database of sales transactions. This refers to discovering all associations among items in a transaction such that the presence of some items will imply the presence of other items in the same transaction. Another source of data mining is ordered data, such as stock market and point of sales data. Examples of data mining applications on ordered data include searching for similar sequences, e.g., stocks with similar movement in stock prices, and sequential patterns, e.g., grocery items bought over a series of visits in sequence. From the above examples it can be appreciated that the application-dependent nature of data mining requires proper problem identification and formulation as a prerequisite to the knowledge discovery process.

Another data mining application, which involves mining classification rules from large computer databases, is the focus of the present invention. Specifically, mining classification rules refers to method to develop rules which group data tuples together based on certain common features (also referred to as attributes). For example, in a target mailing application, it would be important for a car dealer to know the common features of its customers so that catalogs of new models can be targeted to those customers having those features in order to maximize the return from the marketing program. The same paradigm extends naturally to other applications, such as franchise/store location, credit approval, and treatment-appropriateness determinations.

In general, the problem of mining classification rules can be stated as follows. Given a large database, in which each tuple has many known features, classifying all tuples in this database into m groups according to their features. Also given is a training database, in which each tuple has the features of the large database plus a group identity. We want to (1) learn the relationship between "features" and group identity from the training database, and then (2) apply the learned knowledge to classify the large database into groups. Methods for development of a training database (which is used as the input to the present invention) and the methods for classification of the database using the classification rules generated by the present invention ((2) above) are well-known in the art. See, for example, "R. Agrawal, et al., An Interval Classifier for Database Mining Applications, *Proceedings of the 18th International Conference on Very Large Data Bases*, pp. 560–573, August 1992, which is hereby incorporated by reference. Thus, we shall focus our discussion on methods for (1) henceforth. Note that we would naturally like the training set large enough so that the "relationship" we learn in (1) is valid. However, a large training set may incur excessive processing costs. See e.g., "J. R. Quinlan, Induction of Decision Trees, *Machine Learning*, Vol. 1, pp. 81–106, 1986.", (when forming a sophisticated predicate from a combination of features is needed, the execution time grows exponentially with the size of a training database). To minimize the aforementioned processing costs, prior work has focused on the use of small training sets. On the other hand, as the size of the training set decreases so does the validity of the classification rules derived therefrom. Thus, there is a need for an efficient system and method to develop classification rules from a large training database.

SUMMARY OF THE INVENTION

The present invention advantageously provides a computer implemented system, method and computer program product for database mining wherein the operations of multi-feature (also referred to as multi-attribute) extraction and development of classification rules from a large training database are performed more efficiently than previously known.

Accordingly, an embodiment of the present invention provides a two-step method to improve the performance of multi-feature extraction. Given a large training set of data tuples, the first phase, called the feature identification phase, identifies features, which have good power in separating data tuples, based on a subset of the training set. A feature that has a good power in correlating data tuples into groups is said to have a good discriminating power. Note that since the feature identification phase is performed on a subset of the training set, processing costs are minimized. Limiting this phase to the identification of features having good discriminating power also ensures that the use of a subset of the training set does not adversely affect the validity of the conclusions drawn therefrom.

In the second phase, called the feature combination phase, the identified features are evaluated in combination against the entire training set to determine the final classification rules. The prior identification of features having good discriminating power advantageously minimizes processing costs during this phase (which is run against the entire training set). The use of multiple features advantageously increases the discrimination power beyond that of the individual features.

An embodiment of the present invention provides a computer-implemented method of mining classification rules from a computer database. The database includes a plurality of data tuples, each data tuple including a plurality of features. The database also includes a training set including the same data tuples as the database, each data tuple in the training set further including a group identifier. The computer-implemented-method comprises the steps of: first, evaluating each feature in a subset of the training set as a function of its correlation with the group identifier, and identifying those features, evaluated as having an ID score exceeding a predetermined ID threshold; second, combining identified features into feature pairs and evaluating each feature pair in the training set as a function of its correlation with any one of the group identifiers, and identifying those feature pairs having a combination score which exceeds a predetermined feature combination threshold; and classifying the database as a function the identified features and the identified feature pair.

BRIEF DESCRIPTION OF THE DRAWINGS

These, and other objects, features and advantages of the present invention will become apparent from the following detailed description, appended claims, and accompanying drawings, wherein:

DETAILED DESCRIPTION OF A PREFERRED EMBODIMENT

Figure 1:
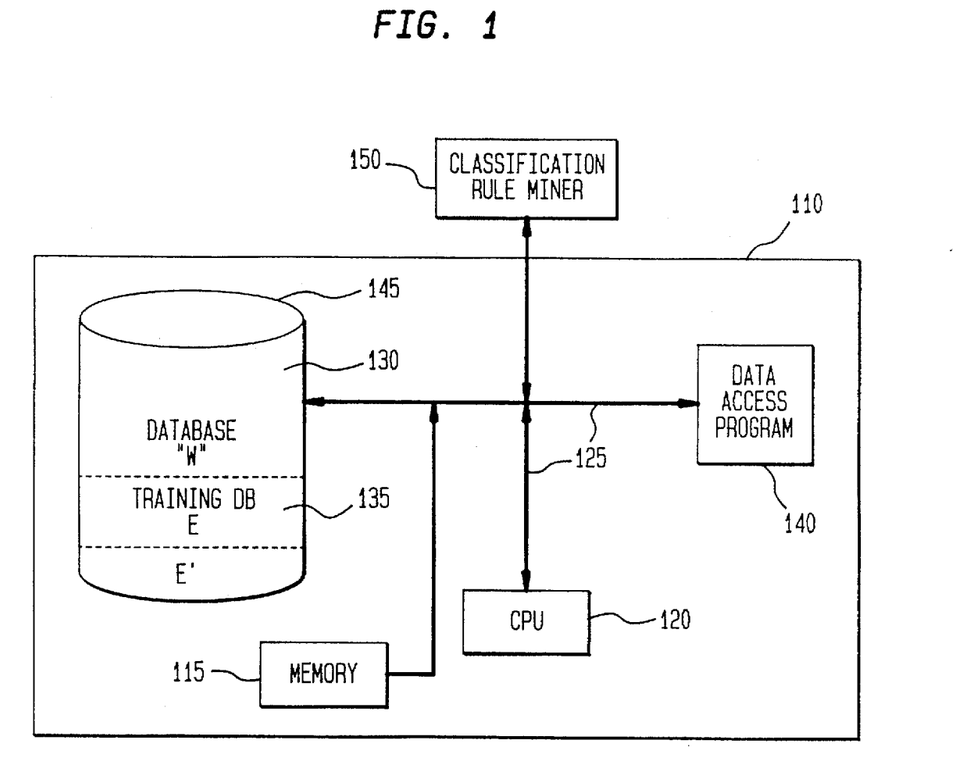
FIG. 1 is an embodiment of a system according to the present invention.

Referring now to the drawings and more particularly to FIG. 1, an embodiment of a system in accordance with the present invention is shown. A computing system 110 includes a CPU 120 which is coupled via data path 125 to a non-volatile storage device 145 such as a magnetic or optical disk drive which includes a database W 130. The system also preferably includes a memory 115 and a data access program 140, both of which are also coupled to the data path 125. Data may be retrieved from the database 130 by the data access program 140. An example of such a system is that sold by the IBM Corporation under the trademark RS6000. An example database 130 and data access program 140 is that sold by the IBM Corporation under the trademark DB2/6000. (Both the RS6000 and DB2/6000 are available from IBM Corporation, Armonk, N.Y.) A classification miner 150 according to the present invention is also coupled to the system via data path 125. Those skilled in the art will appreciate that the classification miner 150 of the present invention can be instantiated as computer readable program code stored on the non-volatile storage device 145 and/or transferred into the memory 115 for execution by the CPU 120. The database W 130 consists of two parts: one is the database W 130 itself, and the other is a training database E 135. Each data tuple in the database W consists of a set of n attributes (also referred to as features), $\{A_1, A_2, \ldots, A_n\}$. Example attributes may be ages, salary ranges, genders, zip codes, census data. Each data tuple in the training set E 135 consists of the same attributes as tuples in the database W 130, and additionally has a group identity associated with it. An example of a group identity is the type of car owned, say "compact", "utility", or "luxury". The object here is to identify features from $\{A_1, A_2, \ldots, A_n\}$ that have a strong correlation with the group identity. Following the above example, one may want to know what features, e.g., ages, salary ranges, genders, and/or zip codes, of a customer, indicate the type of car he is likely to own. The classification miner 150 of the present invention is employed to extract common features from the training data in E for each group identity. The features extracted are ultimately utilized by the data access program 140 to facilitate the classification and retrieval of the data in W. As discussed previously, the use of the extracted features to facilitate the classification and retrieval of data in the database 130 is well known in the art, is not part of this invention, and so will not be discussed in detail.

Figure 2:
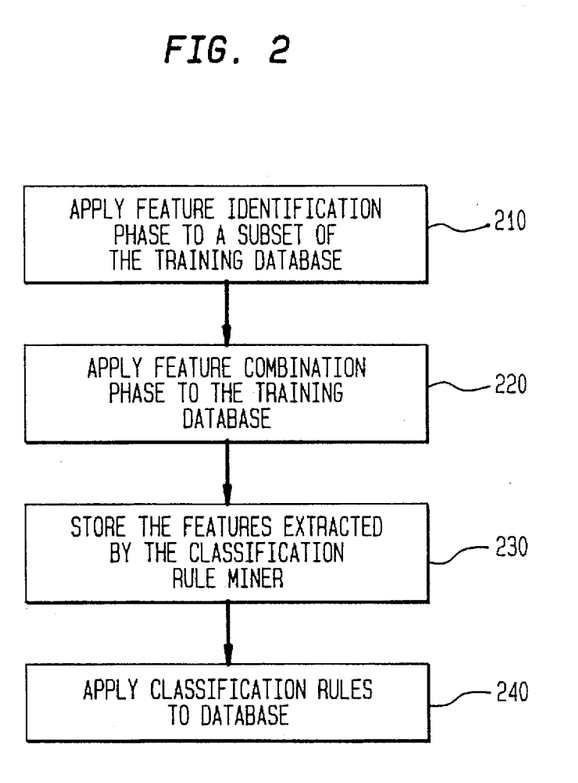
FIG. 2 is an embodiment of a classification miner according to the present invention.

FIG. 2 shows an embodiment of the classification rule miner 150 of the present invention for obtaining classification rules. The classification rule miner 150 is preferably embodied in a computer usable medium as computer readable program code having access to the database 130. Given a large training set of data tuples, in step 210, the feature identification phase, features in a subset E' of the training database E 135, which have good power in separating data tuples, are identified and evaluated. In step 220 the extracted features are evaluated in combination in the feature combination phase, to form multi-feature predicates and increase their discriminating power. In step 230, the multi-predicate classification rules extracted, i.e., the rules correlating the extracted features to given group identities, may be stored by the classification rule miner. In step 240, the database 130 may be classified into groups using the classification rules developed in steps 210 and 220. Note that, in step 210, the feature identification phase is performed on a randomly selected subset E' of the training database 135 whereas the feature combination phase in step 220 is performed on the entire training database. Thus the validity of the features extracted is preserved due to their good discrimination power while minimizing execution overhead by the use of only a subset E' of the training database. The identification of the extracted features prior to execution of the feature combination phase—also minimizes execution overhead for this phase.

Figure 3:
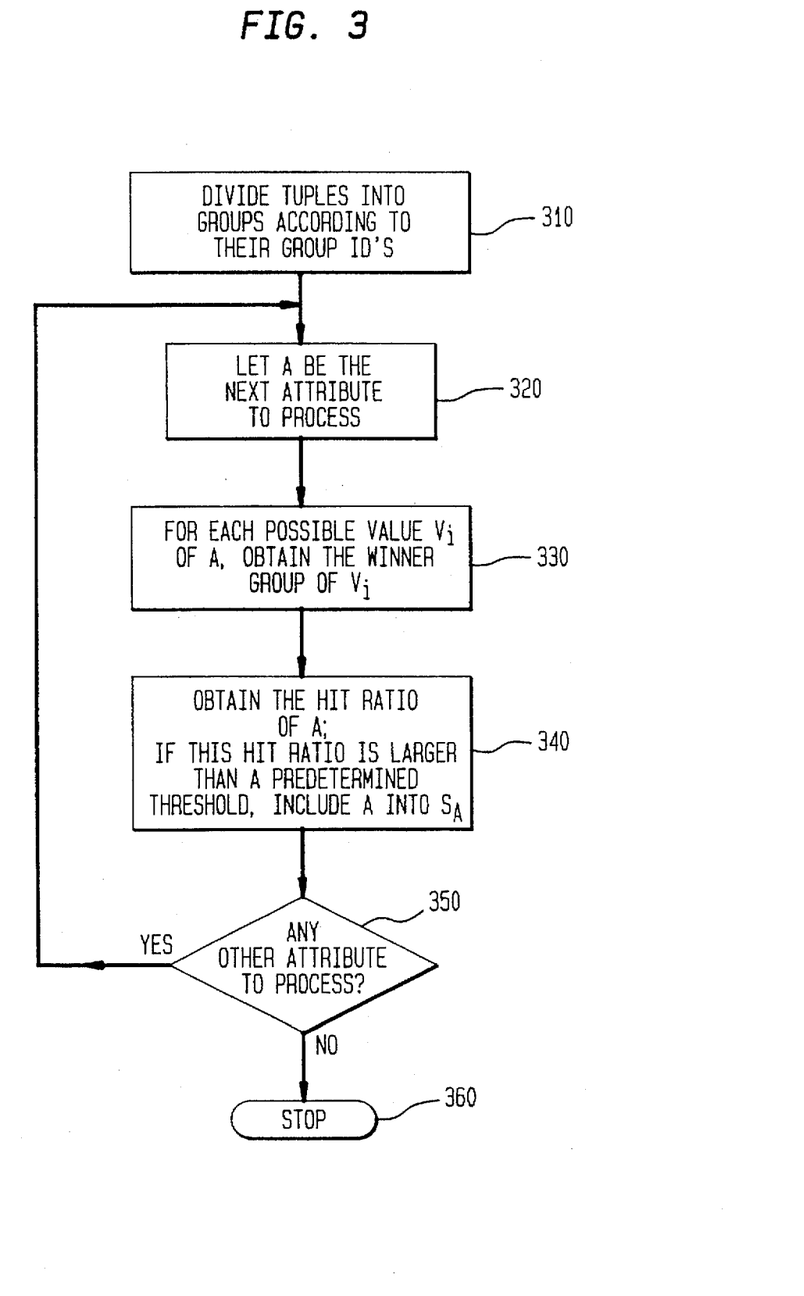
FIG. 3 is an embodiment of the feature identification phase shown in FIG. 2.

FIG. 3 shows an embodiment of the feature identification phase, which is applied only to a subset E' of the training database E 135. From this phase, we would like to identify attributes that have good discriminating powers for the associated grouping. In step 310, tuples in the database W 130 are divided into several groups according to their group id's as illustrated in Table 1. The discriminating power of each attribute is then evaluated by the following steps. In step 320, let A denote the next attribute to be processed. Suppose $(v_1, v_2, \ldots, v_m)$ are m possible values of attribute A. The winner group for a value $v_i$ of attribute A is the group that has the most tuples with their attribute $A=v_i$. In step 330, the winner group for each value of attribute A is obtained. According to the winner groups of various values of A, a hit ratio of attribute A is obtained in step 340, where the hit ratio of attribute A is the percentage of tuples which, according to their corresponding attribute values, fall into their winner groups. It can be seen that the stronger the relationship between an attribute and the group identity is, the larger the hit ratio will be. A hit ratio of an attribute approaches a value of 1 as that attribute more uniquely correlates to the group identity. The hit ratio is thus a measurement of discriminating power. We include attribute A into a set $S_A$ for future processing if the hit ratio of A is larger than a predetermined threshold. As a result, those features with poor discriminating power will be removed from later processing, and processing costs are thus reduced. The "winner attribute" refers to the attribute with the largest hit ratio. In step 350, if there are more attributes to investigate, we go back to 320; if not, then this phase stops, in step 360.

Consider a sample profile for classifying 15 children, shown in Table 1, as an example. Recall that this profile is a random subset E' of the large training database E 135. In Table 1, each tuple, corresponding to each child, contains values for a series of features, i.e., the columns labeled Gender, Age, Beverage (preferred), State (of residence), and a Group id (identity). (For ease of explanation, each tuple is given a label in the first column, which is, however, not part of the features.) We now would like to evaluate the correlation between the features (i.e., Gender, Age, Beverage and State, in this case) and the group identity.

For ease of understanding, Table 2 contains a sample output for the feature identification method shown in FIG. 3. Referring now to FIG. 3, in step 310, the tuples may be divided according to their group identity (as shown in Table 1). In step 320, the profile is classified according to the attribute Gender. In step 320, the winner group for the value "M" (Male) of the attribute "Gender" is obtained. A shown in Table 1, Group id I has 4 tuples whose Gender attribute has a value of Male; similarly there is 1 tuple in group II, and 2 tuples in group III. Group I is therefore the "winner group" for the value "Male" of the attribute "gender". Similarly, Table 1 shows that Group III is the winner group for the value "Female" of the attribute "gender" with 4 tuples having this value. As a result, there are 8 tuples, out of the 15 tuples in the Table 1 training subset, falling into their winner groups for the attribute gender. The hit ratio of the attribute gender is thus $$\frac{8}{15}$$

as summarized

TABLE 1

A sample profile for classifying 15 children.

| Label | Gender | Age | Beverage | State | Group id |
|---|---|---|---|---|---|
| 1 | M | 3 | water | CA | I |
| 2 | F | 4 | juice | NY | I |
| 3 | M | 4 | water | TX | I |
| 4 | F | 4 | milk | TX | I |
| 5 | M | 5 | water | NY | I |
| 6 | M | 3 | juice | CA | I |
| 7 | M | 3 | water | CA | II |
| 8 | F | 5 | juice | TX | II |
| 9 | F | 5 | juice | NY | II |
| 10 | F | 6 | milk | TX | III |
| 11 | M | 4 | milk | NY | III |
| 12 | M | 5 | milk | CA | III |
| 13 | F | 4 | milk | TX | III |
| 14 | F | 6 | water | NY | III |
| 15 | F | 6 | water | CA | III |

TABLE 2

Distribution when the profile is classified by genders.

| Gender | I | II | III | (max, group) |
|---|---|---|---|---|
| Male | 4 | 1 | 2 | (4, I) |
| Female | 2 | 2 | 4 | (4, III) |
| hit ratio: | | | | 8/15 | in Table 2. If the predetermined threshold in step 340 is, for example, $$\frac{7}{15},$$

then the attribute Gender is preferably included into $S_A$.

In step 350, the loop formed by steps 320 to 340 is repeated for the remaining attributes. As for the attribute Gender, the profile is classified to obtain the winner group for each value of the attribute Age. The results, summarized in Table 3, show the hit ratio for the attribute age is $$\frac{10}{15}.$$

Following

TABLE 3

Distribution when the profile is classified by ages.

| Age | I | II | III | (max, group) |
|---|---|---|---|---|
| 3 | 2 | 1 | 0 | (2, I) |
| 4 | 3 | 0 | 2 | (3, I) |
| 5 | 1 | 2 | 1 | (2, II) |
| 6 | 0 | 0 | 3 | (3, III) |
| hit ratio: | | | | 10/15 |

TABLE 4

Distribution when the profile is classified by beverages.

| Beverage | I | II | III | (max, group) |
|---|---|---|---|---|
| Juice | 2 | 2 | 0 | (2, II) |
| Water | 3 | 1 | 2 | (3, I) |
| Milk | 1 | 0 | 4 | (4, III) |
| hit ratio: | | | | 9/15 | the same procedure, we classify the profile in Table 1 according to attributes beverage and State, and obtain the results in Tables 4 and 5, respectively. As shown in Tables 4 and 5, the resulting hit ratios of the attributes Beverage and State are, respectively, $$\frac{9}{15} \text{ and } \frac{6}{15}.$$

Note that since the attribute age has the largest hit ratio among the four attributes, attribute age is the "winner attribute" in this example. If the predetermined threshold, in step 340 is $$\frac{7}{15},$$

then attributes age, and beverage are also included into $S_A$, whereas the attribute State is not.

TABLE 5

Distribution when the profile is classified by states.

| State | I | II | III | (max, group) |
|---|---|---|---|---|
| CA | 2 | 1 | 2 | (2, I) |
| NY | 2 | 1 | 2 | (2, I) |
| TX | 2 | 1 | 2 | (2, I) |
| hit ratio: | | | | 6/15 |

TABLE 6

A sample profile for preferred vehicles.

| Id | Gender | Income | Vehicle |
|---|---|---|---|
| 1 | male | low | car |
| 2 | male | low | car |
| 3 | female | high | car |
| 4 | female | high | car |

TABLE 6-continued

A sample profile for preferred vehicles.

| Id | Gender | Income | Vehicle |
|----|--------|--------|---------|
| 5 | male | high | bike |
| 6 | male | high | bike |
| 7 | female | low | bike |
| 8 | female | low | bike |

Note that the above process evaluates the relationship between the group identity and each attribute, one by one. However, in some cases, the group identity is less dependent on the value of a single attribute. Rather, the group identity depends on the combined values of a set of attributes, particularly for attributes having a strong interrelationship between them. Consider the profile in Table 6 as a simple example. The data in Table 6 infers that a male with low income and a female with high income usually drive cars, whereas a male with high income and a female with low income ride bikes. In this case, the correlation between "vehicle" (corresponding to the group id in Table 1) and either the "gender or income attribute" alone, is not strong since neither the gender nor income attribute alone has a good discriminating power on the vehicle. However, a combination of gender and income (e.g., a male and low income or female and high income) does have a good discriminating power on the vehicle use attribute. This illustrates the value of the feature combination phase, which will now be discussed.

Figure 4:
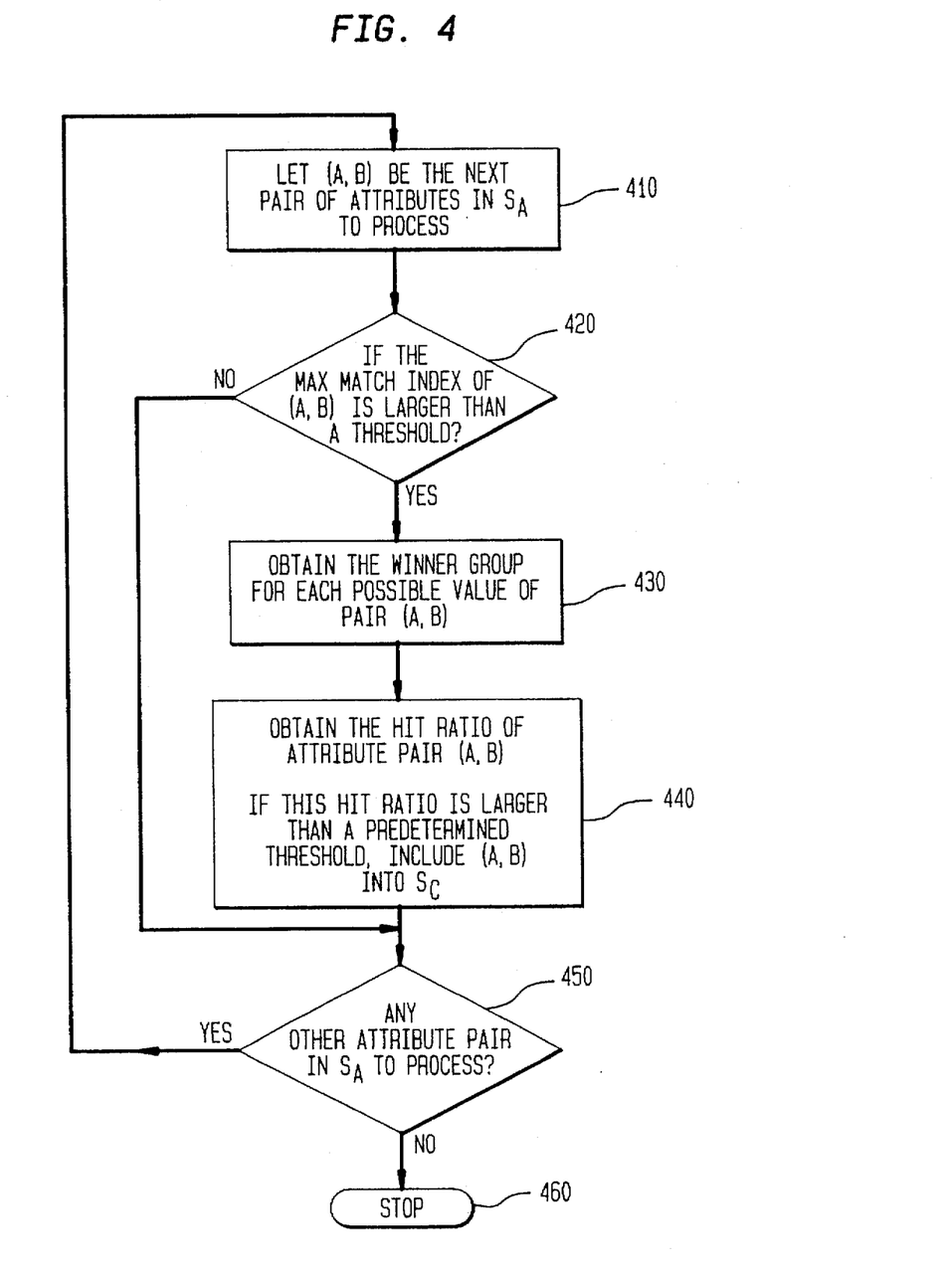
FIG. 4 is an embodiment of the feature combination phase shown in FIG. 2.

FIG. 4 shows an embodiment of a feature combination phase according to the present invention. As discussed, this phase (unlike the feature identification phase) is applied to the entire training database E 135. By way of overview, we want to investigate the discriminating power of combined features in training database 135. However, to reduce processing costs, we preferably limit processing to those attributes whose individual hit ratios meet the predetermined threshold. That is the reason we shall only evaluate combinations of the individual attributes include in $S_A$. In addition, instead of evaluating every pair of attributes, we shall preferably only process attribute pairs whose max match indexes meet another threshold, where a max match index is a heuristic indication of how likely a pair of combined attributes will have a good discriminating power. Those skilled in the art will appreciate that such predetermined thresholds can be advantageously adjusted in accordance with the trade-off between processing costs and the quality of a given final answer required. The max match index may be obtained as follows. First, let A and B be two attributes to be used in combination to form a multi-predicate classifier. Let domain(A)={$v_1, v_2, \ldots, v_m$} and domain(B)={$u_1, u_2, \ldots, u_n$}, where m and n are, respectively, the numbers of distinct values of attributes A and B. Let g be the number of groups. Also, let $n_A(i, k)$ be the number of tuples, each of which is in group k and has a value of $v_i$ in its attribute A. Similarly, $n_B(j, k)$ is the number of tuples, each of which is in group k and has a value of $u_j$ in its attribute B. For the example profile in Table 1, if attribute A is "Gender" then domain(A)={Male, Female} and m=2 and g=3. From Table 2, we have $n_A(1,1)=4$, $n_A(1,2)=1$, $n_A(1,3)=2$, and $n_A(2,1)=2$. Then, the match index of two attributes A and B can be obtained by:

$$\sum_{1 \leq i \leq m} \sum_{1 \leq j \leq n} \max_{1 \leq k \leq g} \{\min(n_A(i,k), n_B(j,k))\}.$$

Referring now to FIG. 4 in step 410, let (A,B) be the next attribute pair in set $S_A$ to process. In step 420, if the max match index of (A,B) does not reach the predetermined threshold, skip this pair. In step 430, the winner group of each combined value of attribute pair (A,B) is determined. According to the winner groups of various values of (A,B), the hit ratio of (A,B) is obtained in 440. In 450, if there are more attribute pairs to investigate, we go back to 410; if not this phase stops, in step 460.

Consider the profile in Table 1 for example. As discussed previously, the feature identification phase yields $S_A$ containing attributes Gender, Age and Beverage. Referring again to FIG. 4, in step 410, let (A,B) be the next attribute pair in set $S_A$ to process. In step 420, assume the predetermined threshold is 12. Using the formula discussed previously yields a max match index for the attribute pair (gender,age) of (2+3+1+2)+(2+2+2+3)=17, (larger than the threshold 12). In step 430, the winner group of each value of attribute pair (gender,age) is determined. The results are summarized in Table 7. In step 440 a hit ratio for the combination of $$\frac{11}{15}$$

is obtained (see Table 7). If the hit ratio is larger than a predetermined threshold, then this attribute pair may be included into a combined feature set, $S_C$. In step 450, the process repeats for the remaining attributes by looping through steps 420 to 450. Thus, the resulting max match index of attribute pair (gender,beverage) is 15, and the corresponding hit ratio is $$\frac{12}{15}.$$

Note that the attribute pair (gender,beverage), which does not contain the individual winner attribute Age, in fact has a better discriminating power than the (gender,age) pair. Those skilled in the art will appreciate that within the scope of the invention, by following the same procedure, predicates with more than 2 attributes can be constructed.

Now that the invention has been described by way of the preferred embodiment,

TABLE 7

Combining genders and ages to classify the profile in Table 1.

| Gender and Age | I | II | III | (max, group) |
|----------------|---|----|-----|--------------|
| male & 3 | 2 | 1 | 0 | (2, I) |
| male & 4 | 1 | 0 | 1 | (1, I) |
| male & 5 | 1 | 0 | 1 | (1, I) |
| female & 4 | 2 | 0 | 1 | (2, I) |
| female & 5 | 0 | 2 | 0 | (2, II) |
| female & 6 | 0 | 0 | 3 | (3, III) |
| hit ratio: | | | | 11/15 |

TABLE 8

Combining genders and beverages to classify the profile in Table 1.

| Gender and Beverage | I | II | III | (max, group) |
|---|---|---|---|---|
| male & juice | 1 | 0 | 0 | (1, I) |
| male & water | 3 | 1 | 0 | (3, I) |
| male & milk | 0 | 0 | 2 | (2, III) |
| female & juice | 1 | 2 | 0 | (2, II) |
| female & water | 0 | 0 | 3 | (3, III) |
| female & milk | 1 | 0 | 1 | (1, III) |
| hit ratio: | | | | 12/15 | various modifications and improvements will occur to those of skill in the art. Thus, it should be understood that the preferred embodiment has been provided as an example and not as a limitation. The scope of the invention is defined by the appended claims.

We claim:

1. A computer-implemented method of mining classification rules from a computer database which includes a plurality of data tuples, each data tuple including a plurality of features, the database further including a training set including the data tuples, each data tuple in the training set including a group identifier, comprising the steps of:

(a) evaluating each feature in a subset of the training set as a function of its correlation with the group identifier, and identifying said features, responsive to said step of evaluating, having an ID score exceeding a predetermined ID threshold;

(b) combining identified features into feature pairs and evaluating each feature pair in the training set as a function of its correlation with said any one of the group identifiers, and identifying said feature pairs having a combination score which exceeds a predetermined feature combination threshold; and (c) classifying the database as a function the identified features and the identified feature pair.

2. The method of claim 1, further comprising the step of storing the identified features and the identified feature pair in a memory, responsive to said step (b).

3. The method of claim 1, wherein said step of evaluating each feature as a function of its correlation with the group identifier comprises the steps of:

sorting the data tuples according to the group identifier;

performing the following steps for said each feature in the subset of the training set, wherein said each feature includes a plurality of values:

for each value of a given feature, determining a winner group identifier which is associated with a greatest number of the data tuples including said each value; and determining a percentage of the data tuples associated with the winner group identifier.

4. The method of claim 1 wherein said step of evaluating each feature pair as a function of its correlation with said any one of the group identifiers comprises the steps of:

determining a maximum match index for said each identified feature pair and eliminating from further processing all identified feature pairs having a maximum match index score less than a maximum match index threshold.

5. The method of claim 1 wherein said step of evaluating each feature pair as a function of its correlation with said any one of the group identifiers comprises the steps of:

performing the following steps for said each feature pair in the training set, wherein said each feature pair includes a plurality of values:

for each value of a given feature, determining a combination winner group identifier which is associated with a greatest number of the data tuples including said each value; and determining a percentage of the data tuples associated with the combination winner group identifier.

6. A computer program product comprising:

a computer usable medium having computer readable program code means embodied therein for mining classification rules from a computer database which includes a plurality of data tuples, each data tuple including a plurality of features, the database further including a training set including the data tuples, each data tuple in the training set including a group identifier, said computer readable program code means comprising:

feature identification program code means for causing the computer to evaluate each feature in a subset of the training set as a function of its correlation with the group identifier, and identify said features having an ID score exceeding a predetermined ID threshold;

feature combination program code means for causing the computer to combine identified features into feature pairs and evaluate each feature pair in the training set as a function of its correlation with said any one of the group identifiers, and identify said feature pairs having a combination score which exceeds a predetermined feature combination threshold, responsive to said computer readable feature identification program code means; and computer readable program code means for causing the computer to classify the database as a function the identified features and the identified feature pair.

7. The computer program product of claim 6, comprising:

a memory for storing the identified features and the identified feature pair, responsive to said computer readable feature combination program code means.

8. The computer program product of claim 6 wherein said feature identification program code means for causing the computer to evaluate each feature in a subset of the training set as a function of its correlation with the group identifier, comprises:

computer readable program code means for causing the computer to effect sorting the data tuples according to the group identifier;

computer readable program code means for causing the computer to iteratively execute the following for said each feature in the subset of the training set, wherein said each feature includes a plurality of values:

computer readable program code means for causing the computer, for each value of a given feature, to determine a winner group identifier which is associated with a greatest number of the data tuples including said each value; and computer readable program code means for causing the computer to determine a percentage of the data tuples associated with the winner group identifier.

9. The computer program product of claim 6 wherein said feature combination program code means for causing the computer to combine identified features into feature pairs and evaluate each feature pair in the training set as a function of its correlation with said any one of the group identifiers, comprises:

computer readable program code means for causing the computer to determine a maximum match index for said each identified feature pair and eliminate from further processing all identified feature pairs having a maximum match index score less than a maximum match index threshold.

10. The computer program product of claim 6 wherein said feature combination program code means for causing the computer to combine identified features into feature pairs and evaluate each feature pair in the training set as a function of its correlation with said any one of the group identifiers, comprises:

computer readable program code means for causing the computer to iteratively execute the following for said each feature pair in the training set, wherein said each feature pair includes a plurality of values:

computer readable program code means for causing the computer, for each value of a given feature, to determine a combination winner group identifier which is associated with a greatest number of the data tuples including said each value; and computer readable program code means for causing the computer to determine a percentage of the data tuples associated with the combination winner group identifier.

11. A program storage device readable by a computer tangibly embodying a program of instructions executable by said computer to perform method steps for mining classification rules from a computer database which includes a plurality of data tuples, each data tuple including a plurality of features, the database further including a training set including the data tuples, each data tuple in the training set including a group identifier, said method steps comprising:

(a) evaluating each feature in a subset of the training set as a function of its correlation with the group identifier, and identifying said features, responsive to said step of evaluating, having an ID score exceeding a predetermined ID threshold;

(b) combining identified features into feature pairs and evaluating each feature pair in the training set as a function of its correlation with said any one of the group identifiers, and identifying said feature pairs having a combination score which exceeds a predetermined feature combination threshold; and (c) classifying the database as a function the identified features and the identified feature pair.

12. The program storage device of claim 11, further comprising the step of storing the identified features and the identified feature pair in a memory, responsive to said step (b).

13. The program storage device method of claim 11, wherein said step of evaluating each feature as a function of its correlation with the group identifier comprises the steps of:

sorting the data tuples according to the group identifier;

performing the following steps for said each feature in the subset of the training set, wherein said each feature includes a plurality of values:

for each value of a given feature, determining a winner group identifier which is associated with a greatest number of the data tuples including said each value; and determining a percentage of the data tuples associated with the winner group identifier.

14. The program storage device of claim 11 wherein said step of evaluating each feature pair as a function of its correlation with said any one of the group identifiers comprises the steps of:

determining a maximum match index for said each identified feature pair and eliminating from further processing all identified feature pairs having a maximum match index score less than a maximum match index threshold.

15. The program storage device of claim 11 wherein said step of evaluating each feature pair as a function of its correlation with said any one of the group identifiers comprises the steps of:

performing the following steps for said each feature pair in the training set, wherein said each feature pair includes a plurality of values:

for each value of a given feature, determining a combination winner group identifier which is associated with a greatest number of the data tuples including said each value; and determining a percentage of the data tuples associated with the combination winner group identifier.

* * * * *